United States Patent
Kanda et al.

(10) Patent No.: US 6,751,176 B1
(45) Date of Patent: Jun. 15, 2004

(54) OPTICAL DISK WITH BUFFER AREA AND RECORDING AND REPRODUCING APPARATUS AND METHODS

(75) Inventors: Yoshihiro Kanda, Osaka (JP); Mitsurou Moriya, Nara (JP); Mitsuteru Fujimoto, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/462,718

(22) PCT Filed: Jan. 28, 1999

(86) PCT No.: PCT/JP98/03091

§ 371 (c)(1),
(2), (4) Date: Jan. 12, 2000

(87) PCT Pub. No.: WO99/04391

PCT Pub. Date: Jan. 28, 1999

(30) Foreign Application Priority Data

Jul. 15, 1997 (JP) .............................. 9-190114
May 15, 1998 (JP) ............................ 10-133382

(51) Int. Cl.[7] .............................................. G11B 7/00
(52) U.S. Cl. ........................ 369/53.24; 369/275.3; 369/30.1; 369/47.54; 369/53.29; 369/59.25
(58) Field of Search .......................... 369/53.24, 275.3, 369/30.16, 47.54, 53.29, 59.25, 47.19, 275.4, 53.2, 53.21, 53.31, 47.22, 30.03, 30.1

(56) References Cited

U.S. PATENT DOCUMENTS

| | | | | |
|---|---|---|---|---|
| 4,001,883 A | * | 1/1977 | Strout et al. | 360/48 |
| 4,094,010 A | * | 6/1978 | Pepperl et al. | 369/30.1 |
| 4,229,808 A | | 10/1980 | Hui | |
| 4,980,882 A | * | 12/1990 | Baer et al. | 369/275.3 |
| 5,453,974 A | | 9/1995 | Minoda et al. | |
| 5,511,051 A | * | 4/1996 | Rokutan et al. | 369/44.28 |
| 5,526,331 A | * | 6/1996 | Park et al. | 369/47.12 |
| 5,663,946 A | | 9/1997 | Ohtomo | |
| 5,706,261 A | | 1/1998 | Udagawa | |
| 5,920,526 A | | 7/1999 | Udagawa | |
| 6,272,081 B1 | * | 8/2001 | Murata | 369/47.15 |
| 6,333,904 B1 | * | 12/2001 | Hashimoto | 369/53.44 |

FOREIGN PATENT DOCUMENTS

| | | |
|---|---|---|
| JP | 56-25238 A | 3/1981 |
| JP | 4-162261 | 6/1992 |
| JP | 4-247325 A | 9/1992 |
| JP | 5-036088 A | 2/1993 |
| JP | 6-349252 A | 12/1994 |
| JP | 9-115250 A | 5/1997 |

* cited by examiner

Primary Examiner—Thang V. Tran
Assistant Examiner—Michael Battaglia
(74) Attorney, Agent, or Firm—Merchant & Gould, P.C.

(57) ABSTRACT

An optical disc that has a recognition mark area behind a recorded area and in which the last data in the recorded area is stably accessed, the recognition mark area can be accessed without bringing about an abnormal state, and the first data in a succeeding recorded area, if it exists, is stably accessed. An unrecorded area (5) is provided outside the recorded area (4) of the optical disc (1). A mark area (6) is provided between the recorded area (4) and unrecorded area (5). A recognition mark area (6d) is provided in the mark area (6) in order to recognize the boundary between the recorded area (4) and the unrecorded area (5). In the mark area (6), first and second buffer areas (6b and 6c) are provided respectively in front of and behind the recognition mark area (6d). The width of the first buffer area (6b) is preset to be wider than the access error when the last data (4a) in the recorded area (4) is accessed, and the width of the second buffer area (6c) is preset to be wider than the access error when the recognition mark area (6d) is accessed.

61 Claims, 7 Drawing Sheets

OPTICAL DISK WITH BUFFER AREA AND RECORDING AND REPRODUCING APPARATUS AND METHODS

TECHNICAL FIELD

The present invention relates to an optical disc, its recording method, its recording device, its reproducing method, and its reproducing device. More specifically, it relates to an optical disc having a recognition mark area behind a recorded area, its recording method, its recording device, its reproducing method, and its reproducing device.

BACKGROUND ART

An optical disc is a high-density information recording medium in which information is recorded by using a semiconductor laser and is reproduced by using the difference in the reflectance of light beams between a recorded part and an unrecorded part.

The optical disc is provided with one or a plurality of "recorded area(s)" in which a predetermined information signal is written. "An unrecorded area" in which a new information signal can be written is provided outside the recorded area. In particular, in order to reproduce an optical disc on which recording has been performed several times, it is necessary to know the number of the recorded areas of the disc. In other words, it is necessary to detect "the last recorded area" of the disc to be reproduced. In this way, in order to detect the last recorded area of the disc to be reproduced, it is necessary to access the recorded areas sequentially from the first recorded area by moving the optical head repeatedly. However, it is impossible to know whether a succeeding recorded area exists or not before the optical head is moved to the position, and when the optical head is moved to an unrecorded area, servo control cannot be performed, thus bringing about an abnormal state.

Therefore, in a reproducing method for an optical disc described in Published Unexamined (Kokai) Japanese Patent Application No. Hei 6-349252, an address of a lead-out area is readded at a lead-in area provided in the first position of the recorded area, and then this lead-out area is accessed. Next, an optical head is moved to the succeeding recorded area by repeating one or more jump of one track or a plurality of tracks in the direction to the outer circumference. When it is decided that the optical head reaches the unrecorded area, the optical head is returned toward the inner circumference side without turning on the tracking servo. According to this method, an abnormal state due to the disability of the servo control is prevented.

However, in the reproducing method for the optical disc described in the above-mentioned publication, the optical head cannot be prevented from reaching the unrecorded area in detecting "the last recorded area." Therefore, it becomes necessary to perform an operation of returning the optical head toward the inner circumference side without turning on the tracking servo. Thus, "the last recorded area" cannot be detected efficiently.

Recently, a technique is suggested, in which a recognition mark area for recognizing whether the succeeding area is an unrecorded area or not is provided just behind the last data in the recorded area, and the state of the recognition mark area is detected by the behavior when the recognition mark area is accessed, thereby determining whether the area behind the recognition mark area is an unrecorded area or a recorded area (whether the recorded area is the last recorded area or not). In this technique, when the recognition mark area cannot normally be accessed, the succeeding area is determinined to be the unrecorded area. In this case, when the recognition mark area is accessed, first, the lead-in data at the head of the recorded area is accessed so as to obtain the address of the lead-out area, and then the address of the recognition mark area existing in the vicinity of the head of the lead-out area is accessed. When a new information signal is written in the unrecorded area, a reproducible recording mark that does not cause a data error is recorded in the recognition mark area, and at the same time a new recognition mark area is provided behind the area in which the new information signal is written (the new recorded area).

However, in the above-mentioned marking method, when the recognition mark area is provided just behind the last data in the recorded area, if an access error exists when the last data in the recorded area is accessed, the optical head wrongly jumps to the recognition mark area, which may lead to an unstable access operation. Furthermore, when the recognition mark area is provided just before the unrecorded area, the optical head jumps to the unrecorded area at the time of accessing the recognition mark area, thus bringing about an abnormal state due to the disability of the servo control. In addition, if a succeeding recorded area exists, when the first data in the succeeding recorded area is accessed, the optical head jumps to the recognition mark area, thus bringing about an unstable access operation.

DISCLOSURE OF INVENTION

The present invention is intended to overcome the above-mentioned problem according to the prior art. It is therefore an object of the present invention to provide an optical disc in which a last data in the recorded area is stably accessed, a recognition mark area can be accessed without bringing about an abnormal state, and the first data in a succeeding recorded area, if it exists, is stably accessed, its recording method, its recording device, its reproducing method and its reproducing device.

In order to achieve the above-mentioned object, a first configuration of the optical disc according to the present invention has a concentric or spiral information track, and, behind a recorded area in which information is recorded on the information track, a first buffer area having a width wider than an access error when the last data in the recorded area is accessed, and a recognition mark area are recorded. According to the first configuration of the optical disc, since the optical head can be prevented from jumping to the recognition mark area when the reproducing device accesses the last data in the recorded area, a stable access operation can be realized in any one of states selected from a state in which no recording mark exists in the recognition mark area and a state in which a non-reproducible recording mark is formed.

Furthermore, it is preferable in the above-mentioned first configuration of the optical disc according to the present invention that the width of the first buffer area is 20 tracks or more and 100 tracks or less. It is preferable that the first buffer area be as small as possible since it greatly consumes the recorded area of the optical disc, however, in the access of the reproducing device for the optical disc, an error corresponding to several tens of tracks generally occurs.

Furthermore, it is preferable in the above-mentioned first configuration of the optical disc according to the present invention that the width of the recognition mark area is 2 tracks or less. In order to prevent the tracking from easily being off and to perform the detection and relead-in promptly if the tracking-off occurs, the width of the recognition mark area is desired to be as short as possible. However, in order to record a reproducible recording mark on the recognition mark area that does not bring about a data error, it is necessary to record the reproducible recording mark using the block length for correcting error as a unit. Therefore, the width of the recognition mark area is required to be the length corresponding to the block length for correcting error. Moreover, it is desirable that the width of the recognition mark area is twice or more the block length for correcting error in order to avoid an incorrect recognition even if a data error occurs at the time of reproducing information. For example, in the case of a DVD disc, twice the block length for correcting error is 0.5 tracks to 1.1 tracks. Thus, it is possible to record the reproducible recording mark when the width of the recognition mark area is 2 tracks or less. Therefore, it is preferable that the width of the recognition mark area is 2 tracks or less.

Furthermore, it is preferable in the above-mentioned first configuration of the optical disc according to the present invention that the recognition mark area is in any of states selected from the group consisting of a state in which no recording mark exists, a state in which a reproducible recording mark is formed and a state in which a non-reproducible recording mark is formed.

Furthermore, it is preferable in the above-mentioned first configuration of the optical disc according to the present invention that, behind the recognition mark area, a second buffer area having a width wider than an access error when the recognition mark area is accessed is further recorded. According to such a preferable example, when the recognition mark area is accessed, the optical head can be prevented from jumping to the unrecorded area due to an access error. Furthermore, even if the servo is skipped in the recognition mark area, the optical head is relead-in by the time when it reaches the unrecorded area. Therefore, the optical head can be prevented from jumping to the unrecorded area. Moreover, when the first data in a succeeding area, if it exists, is accessed, the optical head can be prevented from jumping to the recognition mark area. As a result, an unstable access operation or an abnormal state due to the disability of the servo control can be avoided. In this case, it is further preferable that the width of the second buffer area is 20 tracks or more and 100 tracks or less. It is preferable that the second buffer area be as small as possible since it greatly consumes the recorded area of the disc, however, in the access of the reproducing device for the optical disc, an error corresponding to several tens of tracks generally occurs. Furthermore, when the tracking is off in the recognition mark area, the total number of the track traversal number that is required to detect the tracking off and the track traversal number generated following the releading-in process after the tracking is off generally becomes several tracks.

Furthermore, a second configuration of the optical disc according to the present invention has a concentric or spiral information track, and a first buffer area having the width of 20 tracks or more and 100 tracks or less, a recognition mark area having the width of 2 tracks or less, and a second buffer area having the width of 20 tracks or more and 100 tracks or less are recorded behind each of N (wherein N is a natural number) recorded areas in which information is recorded on the information track.

Furthermore, a third configuration of the optical disc according to the present invention has a concentric or spiral information track, and a plurality of units including a recorded area in which information is recorded on the information track, a first buffer area being provided behind the recorded area and having the width of 20 tracks or more and 100 tracks or less, a recognition mark area having the width of 2 tracks or less and a second buffer area having the width of 20 tracks or more and 100 tracks or less are continuously recorded. The recorded state of the last recognition mark area among the plurality of recognition mark areas is different from the recorded states of the other recognition mark areas. According to the third configuration of the optical disc, the last recorded area can be identified by determining the recorded state of the recognition mark area.

Furthermore, it is preferable in the above-mentioned third configuration of the optical disc according to the present invention that the recognition mark area is in any of states selected from the group consisting of a state in which no recording mark exists, a state in which a reproducible recording mark is formed and a state in which a non-reproducible recording mark is formed.

Furthermore, in a first recording method for an optical disc according to the present invention, information is recorded by irradiating an information track of an optical disc with a light beam generated from a light source and by modulating the strength of said light beam in accordance with recording signals. Following the recording of a predetermined information, a first buffer area having a width wider than an access error when the last data in said predetermined information and a recognition mark area are recorded.

Furthermore, it is preferable in the first recording method for an optical disc according to the present invention that the width of the first buffer area is set to be 20 tracks or more and 100 tracks or less.

Furthermore, it is preferable in the first recording method for an optical disc according to the present invention that the width of the recognition mark area is set to be 2 tracks or less.

Furthermore, it is preferable in the first recording method for an optical disc according to the present invention that the recognition mark area is in any of states selected from the group consisting of a state in which no recording mark exists, a state in which a reproducible recording mark is formed and a state in which a non-reproducible recording mark is formed.

Furthermore, it is preferable that the first recording method for an optical disc according to the present invention that, behind the recognition mark area, a second buffer area having a width wider than an access error when the recognition mark area is accessed is further recorded. Furthermore, in this case, it is preferable that the width of the second buffer area is set to be 20 tracks or more and 100 tracks or less.

Furthermore, in a second recording method for an optical disc according to the present invention, information additionally is recorded on the optical disc in which, behind a recorded area in which information is recorded on a concentric or spiral information track, a first buffer area having a width wider than an access error when the last data in the recorded area is accessed, a recognition mark area and a second buffer area having a width wider than an access error when the recognition mark area is accessed are recorded. The method comprises the steps of irradiating the information track of the optical disc, which is made to rotate, with a light beam generated from a light source; controlling the light beam to be positioned on the information track in the recognition mark area; changing the state of the recognition mark area by modulating the strength of the light beam; retrieving a recordable area in which information can be additionally recorded and controlling the light beam to be positioned on the information track in the recordable area; and modulating the strength of the light beam in accordance with signals to be additionally recorded and recording the additional information. According to the second recording method for an optical disc, when the additional information is recorded, the state of the recognition mark area is changed. Consequently, it can be decided whether the succeeding area is a recorded area or an unrecorded area by determining the state of the recognition mark area.

Furthermore, it is preferable in the above-mentioned second recording method for an optical disc according to the present invention that the state of the recognition mark area is changed and then the additional information is recorded on the information track in the recordable area.

Furthermore, it is preferable in the above-mentioned second recording method for an optical disc according to the present invention that the additional information is recorded on the information track in the recordable area and then the state of the recognition mark area is changed.

Furthermore, it is preferable in the above-mentioned second recording method for an optical disc according to the present invention that, behind the recorded area in which the additional information is recorded, the first buffer area having a width wider than an access error when the last data of the additional information in the recorded area is accessed and the recognition mark area are recorded. In this case, it is further preferable that the width of the first buffer area is set to be 20 tracks or more and 100 tracks or less. In this case, it is further preferable that the width of the recognition mark area is set to be 2 tracks or less. In this case, it is further preferable that, behind the recognition mark area, the second buffer area having the width wider than an access error when the recognition mark area is accessed. In this case, it is still further preferable that the width of the second buffer area is set to be 20 tracks or more and 100 tracks or less.

Furthermore, a first configuration of a recording device for an optical disc according to the present invention comprises a rotating means for rotating an optical disc having a concentric or spiral information track, an optical head irradiating the information track with light beam generated from a light source, a control means for controlling the light beam to be positioned on the information track, a modulating means for modulating the strength of the light beam in accordance with information signals to be recorded, wherein the light beam is modulated by the modulating means and, behind a recorded area in which a predetermined information is recorded on the information track, a first buffer area having a width wider than an access error when the last data of the predetermined information is accessed and a recognition mark area are recorded.

Furthermore, it is preferable in the above-mentioned first configuration of a recording device for an optical disc according to the present invention that the width of the first buffer area is set to be 20 tracks or more and 100 tracks or less.

Furthermore, it is preferable in the above-mentioned first configuration of a recording device for an optical disc according to the present invention that the width of the recognition mark area is set to be 2 tracks or less.

Furthermore, it is preferable in the above-mentioned first configuration of a recording device for an optical disc according to the present invention that the recognition mark area is in any of states selected from the group consisting of a state in which no recording mark exists, a state in which a reproducible recording mark is formed and a state in which a non-reproducible recording mark is formed.

Furthermore, it is preferable in the above-mentioned first configuration of a recording device for an optical disc according to the present invention that, behind the recognition mark area, a second buffer area having a width wider than an access error when the recognition mark area is accessed is further recorded. In this case, it is further preferable that the width of the second buffer area is set to be 20 tracks or more and 100 tracks or less.

Furthermore, a second configuration of a recording device for an optical disc according to the present invention, information being additionally recorded on the optical disc in which, behind a recorded area in which information is recorded on a concentric or spiral information track, a first buffer area having a width wider than an access error when the last data in the recorded area is accessed, a recognition mark area and a second buffer area having a width wider than an access error when the recognition mark area is accessed are recorded, comprises a rotating means for rotating the optical disc, an optical head for irradiating the information track with light beam generated from a light source, a retrieving means for retrieving the target information track and controlling the light beam to be positioned on the target information track, and a modulating means for modulating the strength of the light beam:

wherein, when new information is additionally recorded on the optical disc, the information track of the recordable area in which information can be recorded is retrieved by the retrieving means, and then information is additionally recorded on the information track of the recordable area by modulating the strength of light beam in accordance with signals to be additionally recorded by the modulating means, while the recognition mark area is retrieved by the retrieving means, and then the state of the recognition mark area is changed by modulating the strength of the light beam by the modulating means.

Furthermore, it is preferable in the above-mentioned second configuration of a recording device for an optical disc according to the present invention that the state of the recognition mark area is changed and then the additional information is recorded on the information track in the recordable area.

Furthermore, it is preferable in the above-mentioned second configuration of a recording device for an optical disc according to the present invention that the additional information is recorded on the information track in the recordable area and then the state of the recognition mark area is changed.

Furthermore, it is preferable in the above-mentioned second configuration of a recording device for an optical disc according to the present invention that, behind the recorded area in which the additional information is recorded, the first buffer area having a width wider than an access error when the last data of the additional information in the recorded area is accessed and the recognition mark area are recorded. In this case, it is further preferable that the width of the first buffer area is set to be 20 tracks or more and 100 tracks or less. In this case, it is further preferable that the width of the recognition mark area is set to be 2 tracks or less. In this case, it is further preferable that, behind the recognition mark area, a second buffer area having a width wider than an access error when the recognition mark area is accessed is further recorded. In this case, it is further preferable that the width of the second buffer area is set to be 20 tracks or more and 100 tracks or less.

Furthermore, a reproducing method for an optical disc according to the present invention, information being reproduced from the optical disc in which, behind a recorded area in which information is recorded on a concentric or spiral information track, a first buffer area having a width wider than an access error when the last data in the recorded area is accessed, a recognition mark area are recorded, the method comprising the steps of:

irradiating the information track of the optical disc, which is made to rotate, with light beam generated from a light source; retrieving the recognition mark area; determining the state of the recognition mark area; and specifying the recorded area in which recording is completed based on the determined state of said recognition mark area and reproducing information of the specified recorded area.

Furthermore, it is preferable in the above-mentioned reproducing method for an optical disc according to the present invention that the width of the first buffer area is set to be 20 tracks or more and 100 tracks or less.

Furthermore, it is preferable in the above-mentioned reproducing method for an optical disc according to the present invention that the width of the recognition mark area is 2 tracks or less.

Furthermore, it is preferable in the above-mentioned reproducing method for an optical disc according to the present invention that the recognition mark area is in any of states selected from the group consisting of a state in which no recording mark exists, a state in which a reproducible recording mark is formed and a state in which a non-reproducible recording mark is formed.

Furthermore, it is preferable in the above-mentioned reproducing method for an optical disc according to the present invention that, behind the recognition mark area, a second buffer area having a width wider than an access error when the recognition mark area is accessed is further recorded on the optical disc. In this case, it is further preferable that the width of the second buffer area is set to be 20 tracks or more and 100 tracks or less.

Furthermore, a first configuration of a reproducing device for an optical disc according to the present invention, information being reproduced from the optical disc in which, behind a recorded area in which information is recorded on a concentric or spiral information track, a first buffer area having a width wider than an access error when the last data in the recorded area is accessed, a recognition mark area are recorded, comprising:

a rotating means for rotating the optical disc, an optical head for irradiating the information track with light beam generated from a light source; and a retrieving means for retrieving the target information track; wherein the state of the recognition mark area is determined by retrieving the recognition mark area by the retrieving means, the recorded area in which recording is completed being identified based on the determined state of the recognition mark area.

Furthermore, it is preferable in the above-mentioned first configuration of a reproducing device for an optical disc according to the present invention that the width of the first buffer area is set to be 20 tracks or more and 100 tracks or less.

Furthermore, it is preferable in the above-mentioned first configuration of a reproducing device for an optical disc according to the present invention that the width of the recognition mark area is set to be 2 tracks or less.

Furthermore, it is preferable in the above-mentioned first configuration of a reproducing device for an optical disc according to the present invention that the recognition mark is in any of states selected from the group consisting of a state in which no recording mark exists, a state in which a reproducible recording mark is formed and a state in which a non-reproducible recording mark is formed.

Furthermore, it is preferable in the above-mentioned first configuration of a reproducing device for an optical disc according to the present invention that, behind the recognition mark area, a second buffer area having a width wider than an access error when the recognition mark area is accessed is further recorded on the optical disc. In this case, it is further preferable that the width of the second buffer area is set to be 20 tracks or more and 100 tracks or less.

Furthermore, a second configuration of a reproducing device for an optical disc according to the present invention, information being reproduced from the optical disc in which, behind a recorded area in which information is recorded on a concentric or spiral information track, a first buffer area having a width wider than an access error when the last data in the recorded area is accessed, a recognition mark area in which no recording mark exists and a second buffer area having a width wider than an access error when the recognition mark area is accessed are recorded, comprises:

a rotating means for rotating the optical disc, an optical head for irradiating the information track with light beam generated from a light source, a retrieving means for retrieving the target information track, and a reading means for reading the information recorded on the information track; wherein the recorded area to be reproduced is specified by determining that no recording mark exists in the recognition mark area.

Furthermore, a third configuration of a reproducing device for an optical disc according to the present invention, information being reproduced from the optical disc in which, behind a recorded area in which information is recorded on a concentric or spiral information track, a first buffer area having a width wider than an access error when the last data in the recorded area is accessed, a recognition mark area in which no recording mark exists and a second buffer area having a width wider than an access error when the recognition mark area is accessed are recorded, comprises:

a rotating means for rotating the optical disc, an optical head for irradiating the information track with light beam generated from a light source, and a retrieving means for retrieving the target information track; wherein the recorded area to be reproduced is specified by retrieving the recognition mark area by the retrieving means and by determining that the recording mark cannot be retrieved.

Furthermore, it is preferable that the above-mentioned third configuration of a reproducing device for an optical disc according to the present invention further comprises a reading means for reading information recorded on the information track, and the recorded area to be reproduced is specified by determining that the recording mark cannot be read by the reading means.

Furthermore, a fourth configuration of a reproducing device for an optical disc according to the present invention, information being reproduced from the optical disc in which plural sets of a recorded area in which information is recorded, a first buffer area having a width wider than an access error when the last data in the recorded area is accessed, a recognition mark area and a second buffer area having a width wider than an access error when the recognition mark area is accessed are recorded on a concentric or spiral information track, wherein no recording mark is recorded in the last recognition mark area and a reproducible recording mark is recorded in the recognition mark areas other than the last recognition mark area, comprises:

a rotating means for rotating the optical disc, an optical head for irradiating the information track with light beam generated from a light source, a retrieving means retrieving the target information track, and a reading means for reading information recorded on the information track; wherein the last recorded area is specified by determining that no recording mark exists in the recognition mark area.

Furthermore, a fifth configuration of a reproducing device for an optical disc according to the present invention, information being reproduced from the optical disc in which plural sets of a recorded area in which information is recorded, a first buffer area having a width wider than an access error when the last data in the recorded area is accessed, a recognition mark area and a second buffer area having a width wider than an access error when the recognition mark area is accessed are recorded on a concentric or spiral information track, wherein no recording mark is recorded in the last recognition mark area and a reproducible recording mark is recorded in the recognition mark areas other than the last recognition mark area, comprises:

a rotating means for rotating the optical disc, an optical head for irradiating the information track with light beam generated from a light source, and a retrieving means for retrieving the target information track; wherein the last recorded area is specified by retrieving the recognition mark area by the retrieving means and by determining that the recognition mark area cannot be retrieved.

Furthermore, a sixth configuration of a reproducing device for an optical disc according to the present invention, information being reproduced from the optical disc in which plural sets of a recorded area in which information is recorded, a first buffer area having a width wider than an access error when the last data in the recorded area is accessed, a recognition mark area and a second buffer area having a width wider than an access error when the recognition mark area is accessed are recorded on a concentric or spiral information track, wherein no recording mark is recorded in the last recognition mark area and a reproducible recording mark is recorded in the recognition mark areas other than the last recognition mark area, comprises:

a rotating means for rotating the optical disc, an optical head for irradiating the information track with light beam generated from a light source, a retrieving means retrieving the target information track, and a reading means for reading information recorded on the information track; wherein the last recorded area is specified by retrieving the recognition mark area by the retrieving means and by determining that the recognition mark area cannot be read by the reading means.

Furthermore, a seventh configuration of a reproducing device for an optical disc according to the present invention, information being reproduced from the optical disc in which, behind a recorded area in which information is recorded on a concentric or spiral information track, a first buffer area having a width wider than an access error when the last data in the recorded area is accessed, a recognition mark area in which a reproducible recording mark is recorded, and a second buffer area having a width wider than an access error when the recognition mark area is accessed are recorded, comprises:

a rotating means for rotating the optical disc, an optical head for irradiating the information track with light beam generated from a light source, a retrieving means for retrieving the target information track, and a reading means for reading the information recorded on the information track; wherein the recorded area to be reproduced is specified by determining that the reproducible recording mark is recorded in the recognition mark area.

Furthermore, an eighth configuration of a reproducing device for an optical disc according to the present invention, information being reproduced from the optical disc in which, behind a recorded area in which information is recorded on a concentric or spiral information track, a first buffer area having a width wider than an access error when the last data in the recorded area is accessed, a recognition mark area in which a reproducible recording mark is recorded, and a second buffer area having a width wider than an access error when said recognition mark area is accessed are recorded, comprises:

a rotating means for rotating the optical disc, an optical head for irradiating the information track with light beam generated from a light source, a retrieving means for retrieving the target information track; wherein the recorded area to be reproduced is specified by retrieving the recognition mark area by the retrieving means and by determining that the recording mark can be retrieved.

Furthermore, it is preferable that the above-mentioned eighth configuration of a reproducing device for an optical disc according to the present invention further comprises a reading means for reading information recorded on the information track, and the recorded area to be reproduced is identified by determining that the recording mark area can be read by the reading means.

Furthermore, a ninth configuration of a reproducing device for an optical disc according to the present invention, information being reproduced from the optical disc in which plural sets of a recorded area in which information is recorded, a first buffer area having a width wider than an access error when the last data in the recorded area is accessed, a recognition mark area and a second buffer area having a width wider than an access error when the recognition mark area is accessed are recorded on a concentric or spiral information track, wherein a reproducible recording mark is recorded on the last recognition mark area and a non-reproducible recording mark is recorded on the recognition mark area other than the last recognition mark area, comprises:

a rotating means for rotating the optical disc, an optical head for irradiating the information track with light beam generated from a light source, a retrieving means for retrieving the target information track, and a reading means for reading information recorded on the information track; wherein the last recorded area is specified by determining that the reproducible recording mark exists in the recognition mark area.

Furthermore, a tenth configuration of a reproducing device for an optical disc according to the present invention, information being reproduced from the optical disc in which plural sets of a recorded area in which information is recorded, a first buffer area having a width wider than an access error when the last data in the recorded area is accessed, a recognition mark area and a second buffer area having a width wider than an access error when the recognition mark area is accessed are recorded on a concentric or spiral information track, wherein a reproducible recording mark is recorded on the last recognition mark area and a non-reproducible recording mark is recorded on the recognition mark area other than the last recognition mark area, comprises:

a rotating means for rotating the optical disc, an optical head for irradiating the information track with light beam generated from a light source, and a retrieving means for retrieving the target information track; wherein the last recorded area is specified by retrieving the recognition mark area by the retrieving means and by determining that the recognition mark area can be retrieved.

Furthermore, it is preferable that the above-mentioned tenth configuration of a reproducing device for an optical disc according to the present invention further comprises a reading means for reading information recorded on the information track, and the last recorded area is specified by determining that the recording mark area can be read by the reading means.

BEST MODE FOR CARRYING OUT THE INVENTION

Hereinafter, the present invention will be described more specifically referring to the embodiments.

Figure 1:
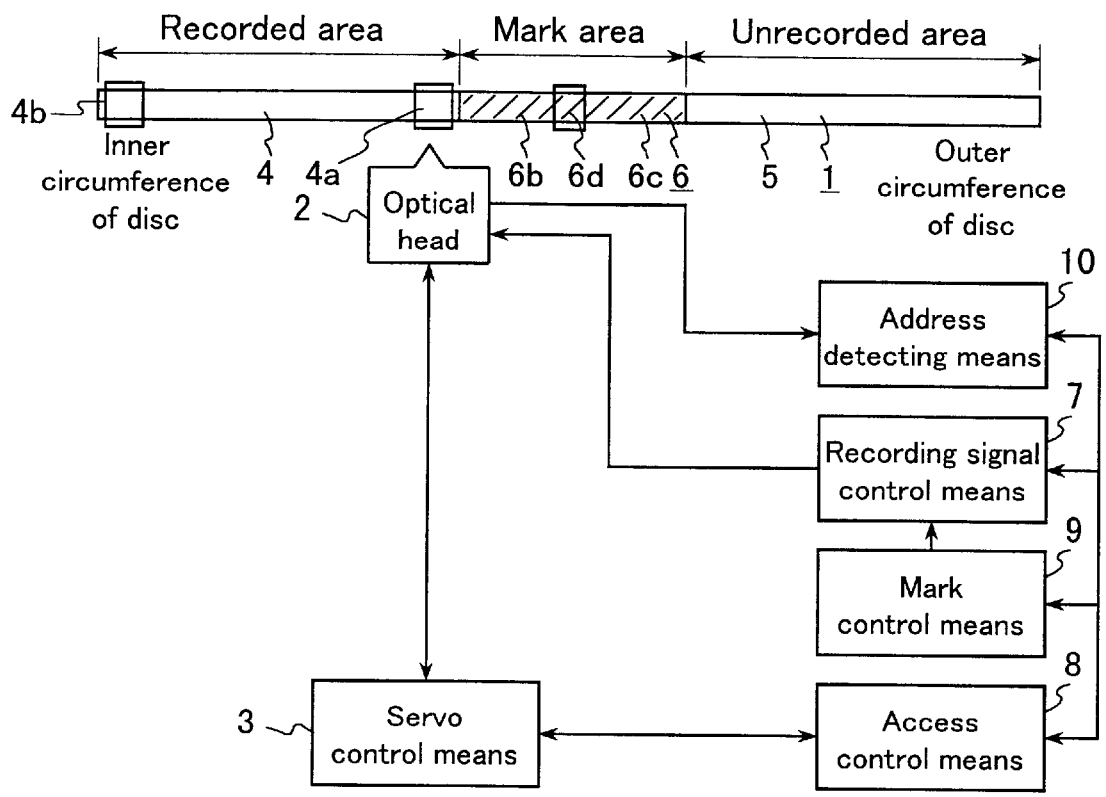
FIG. 1 is a block diagram showing a structure of a recording and reproducing device for an optical disc in one embodiment according to the present invention.
Figure 2:
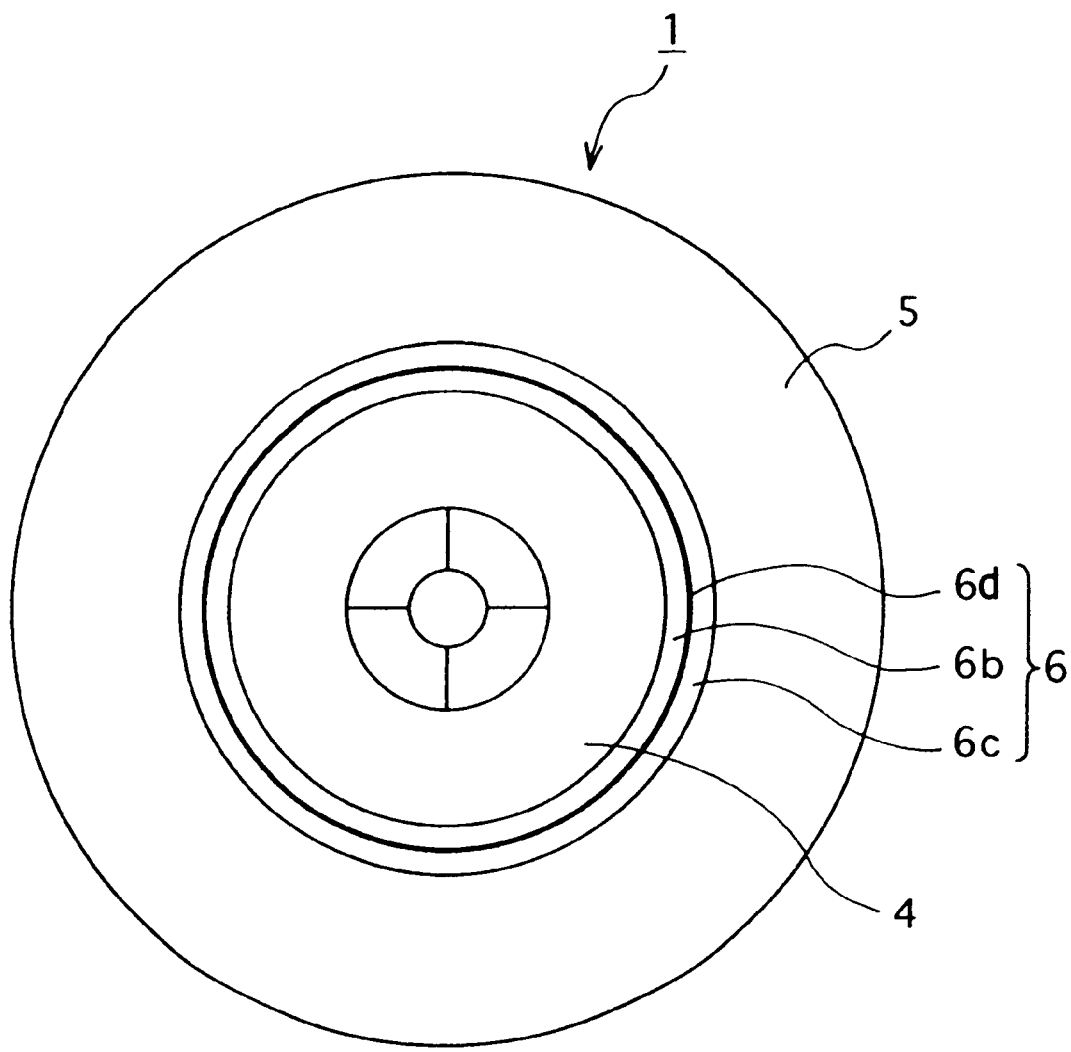
FIG. 2 is a plan view showing a structure of an optical disc in one embodiment according to the present invention.

FIG. 1 is a block diagram showing a structure of a recording and reproducing device for an optical disc in one embodiment according to the present invention; and FIG. 2 is a plan view showing a structure of an optical disc in one embodiment according to the present invention.

In FIG. 1, reference numeral 1 denotes an optical disc, 2 denotes an optical head, 3 denotes a servo control means, 7 denotes a recording signal control means, 8 denotes an access control means, 9 denotes a mark control means and 10 denotes an address detecting means. Furthermore, in FIGS. 1 and 2, reference numeral 1 denotes an optical disk, 4 denotes a recorded area in which information is recorded, 5 denotes an unrecorded area, 6 denotes a mark area, 6b denotes a first buffer area, 6c denotes a second buffer area and 6d denotes a recognition mark area.

As shown in FIG. 1, the optical head 2 is provided in the vicinity of the disc surface of the optical disc 1, which can be rotated by motor. This optical head 2 irradiates the optical disc 1 with a light beam spot, reads (reproduces) and writes (records) information on a concentric or spiral information recording track, and detects servo signals. Furthermore, the servo control means 3 maintains the light beam spot with which the optical head 2 irradiates the optical disc 1 on a designated information recording track.

The access control means 8 transmits an access information to the servo control means 3 based on the address information that the address detecting means 10 detects based on the information that is read from the information recording track. The optical head 2 is moved in the direction of the diameter of the optical disc 1 based on the information from the servo control means 3, thereby accessing the designated information recorded track.

An information signal (recorded signal) to be written on the optical disc 1 is transmitted from the recording signal control means 7 to the optical head 2. Then, the light beam spot whose strength is modulated in accordance with recorded signals is irradiated on the information recorded track of the optical disc 1, whereby the recorded area 4 is formed on the optical disc 1. Furthermore, the information on the information recorded track is read by irradiating the optical disc 1 with the light beam spot whose strength is different from the light beam spot irradiated at the time the information is written and by using the difference in the reflectance of the light beams between the recorded part and the unrecorded part.

The mark control means 9 performs the recording control of the first buffer region 6b, the recognition mark area 6d and the second buffer region 6c by transmitting the recording signals to the optical head 2 by way of the recording signal control means 7 based on the information from the address detecting means 10 after the recording of the recorded area 4 is completed.

Herein, the width of the first buffer area 6b is set to be wider than an access error when the last data 4a in the recorded area 4 is accessed. In the case of a general reproducing device, since an access error that is mainly caused by a track count error and the accuracy of the brake control is several tens of tracks, the width of the first buffer area 6b is set to be about 20 to 100 tracks. When the track pitch is set to be 0.8 $\mu$m, this width corresponds to 16 to 80 $\mu$m. Furthermore, the width of the second buffer area 6c is set to be wider than an access error or an amount of the slip amount of the servo when the recognition mark area 6d is accessed. In the case of a general reproducing device, since the access error and the amount of the slip are several tens of tracks, the width of the second buffer area 6c is set to be about 20 to 100 tracks. When the track pitch is set to be 0.8 $\mu$m, this width corresponds to 16 to 80 $\mu$m. Furthermore, it is preferable that the width of the recognition mark area 6d is two tracks or less, more preferably 0.45 to 1.1 tracks.

The recording of the first and second buffer areas (=lead-out areas) 6b and 6c are performed in the same way and with the same signals as the recording of usual data except that the information showing that it is a lead-out information signal is recorded.

FIGS. 1 and 2 show the states after the first recording is performed. As shown in FIGS. 1 and 2, at the inner circumference of the optical disc 1, the first buffer area 6b, the recognition area 6d and the second buffer area 6c are recorded behind the recorded area 4 in which a predetermined information signal is written. Furthermore, the unrecorded area 5 is provided behind the second buffer area 6c. In this way, when the outer circumference of the second buffer area 6c is the unrecorded area 5, the recognition mark area 6d (about one track of the optical disc=about 0.8 $\mu$m) is in a state in which no recording mark exists. The state in which no recording mark exists is realized by preventing the generation of a recording pulse of the laser from the optical head 2 in the part corresponding to the recognition mark area 6d among a series of recordings following from the first buffer area 6*b*, the recognition area 6*d* and the second buffer area 6*c*. Then, the reproducing device deterinines that no recording mark exists in the recognition mark area 6*d*, access to the recognition mark area 6*d* cannot normally be performed, or data in the recognition mark area 6*d* cannot be reproduced, thereby deciding that the recorded area 4 is the last recorded area. In this case, acknowledging the existence and non-existence of RF signals outputted from the optical head 2 makes it possible to determine whether the recording mark exists in the recognition mark area 6*d* or not.

An access command to the last data 4*a* in the recorded area 4 or to the recognition mark area 6*d*, etc. is transmitted from the access control means 8 to the servo control means 3. Address information of the mark area 6, etc. that is read from the lead-in area 4*b* in the recorded area 4 of the optical disc 1 by the optical head 2 is detected by the address detecting means 10. A recording command of the mark area 6 and an erasing command of the recognition mark are transmitted from the access control means 8 to the mark control means 9. The mark control means 9 performs the recording control of the mark area 6 and the erasing control of the recognition mark with respect to the recording signal control means 7 based on the information from the access control means 8 and the address detecting means 10.

Figure 5:
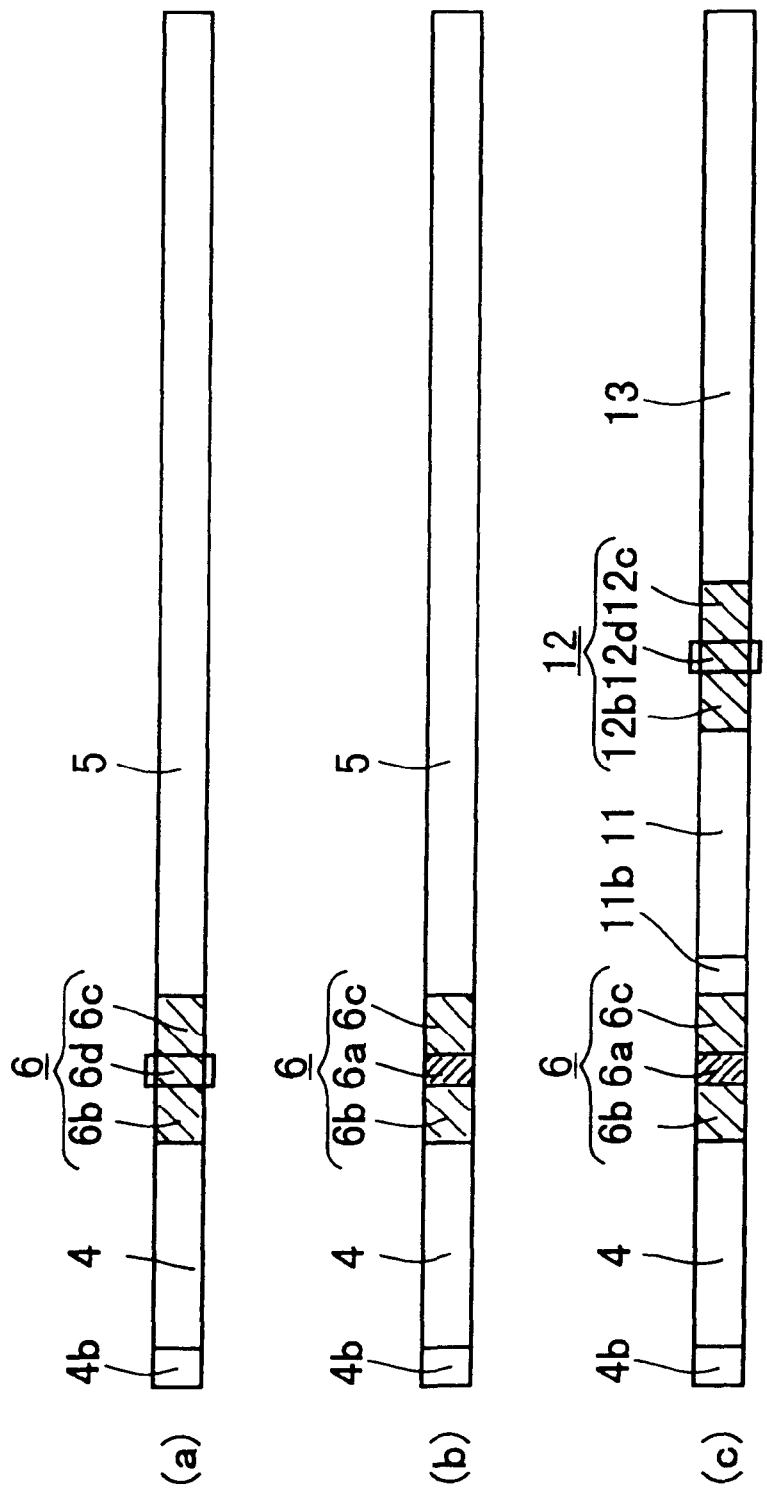
FIG. 5 is a view to explain a method for recording information on an optical disc in one embodiment according to the present invention.

Furthermore, as shown in FIGS. 1 and 2, when the unrecorded area 5 exists at the outer circumference of the recorded area 4 in the optical disc 1, a new information signals can be written in this unrecorded area 5, the state of which is shown in FIG. 5. A reference numeral 11 denotes a new recorded area, 12*b* denotes a new first buffer area, 12*d* denotes a new recognition mark area and 12*c* denotes a second buffer area. In this case, on the recognition mark area 6*d*, a reproducible recording mark 6*a* is recorded, and behind the second buffer area 6*c*, a new recorded area 11, a new first buffer area 12*b*, a new recognition mark area 12*d* in which no recording mark exists and a new second buffer 12*c* are recorded. At the same time, a reproducible recording mark 6*a* is recorded on the recording mark area 6*d*. Furthermore, behind the new second buffer area 12*c*, a new unrecorded area 13 is provided. As mentioned above, the reproducing device determines that no recording mark exists in the recognition mark area, access to the recognition mark area cannot normally be performed, or data in the recognition mark area cannot be reproduced, thereby discriminating the last recorded area. Therefore, in this case, it is decided that the recording area 11 instead of recorded area 4 is the last recorded area.

Moreover, an example of a laminate structure of the optical disc 1 includes a substrate recording layer protecting layer structure, a substrate protecting (dielectric) layer recording layer protecting (dielectric) layer structure, a substrate protecting (dielectric) layer recording layer protecting (dielectric) layer reflective layer structure, and the like. An example of materials for the recording layer of the optical disc 1 includes phase change recording materials containing, for example, TeOx (0<x<1) based material, BiTeAg based material, BiTe Al based material, BiTeAu based material, BiTePd based material, BiSbTe based material, BiAsTe based material, BiTeSn based material, BiTePt based material, GeSbTe based material, GeTeSe based material, GeTeSn based material, or InSe based material, etc. as a main component; dye materials containing, for example, cyanine based material, merocyanine based material, triphenylmethane based material, diarylethane based material, azo based material, quinone based material, squalirium based material, pyrylium based material, indophenol based material, azulenium based material, styryl based material, porphyrin based material, indigo based material, thioindigo based material, oxazine based material, indanthrene based material, complex containing metal based material, anthraquinone based material, phthalocyanine based material, naphthalocyanine based material, or condensed ring based material, etc. as a main component; or the like. In this case, a chemical element belonging to III–VI group of periodic table is appropriately added to the phase change recording material. To the dye material, metal complex, cellulose nitrate, acrylic resins, polystyrene resin, urethane resin, leveling agent, antifoaming agent, antiphlogistic agent, ultraviolet absorber, and the like, are added as a material for improving properties in amounts in the range in which they do not damage the efficiency of materials of the main component. Writing of information on the optical disc 1 is performed by irradiating the information track of the optical disc 1 with a light beam spot from the optical head 2 and by inducing a local thermal change or photochemical change on the recorded area due to light absorption.

Figure 3:
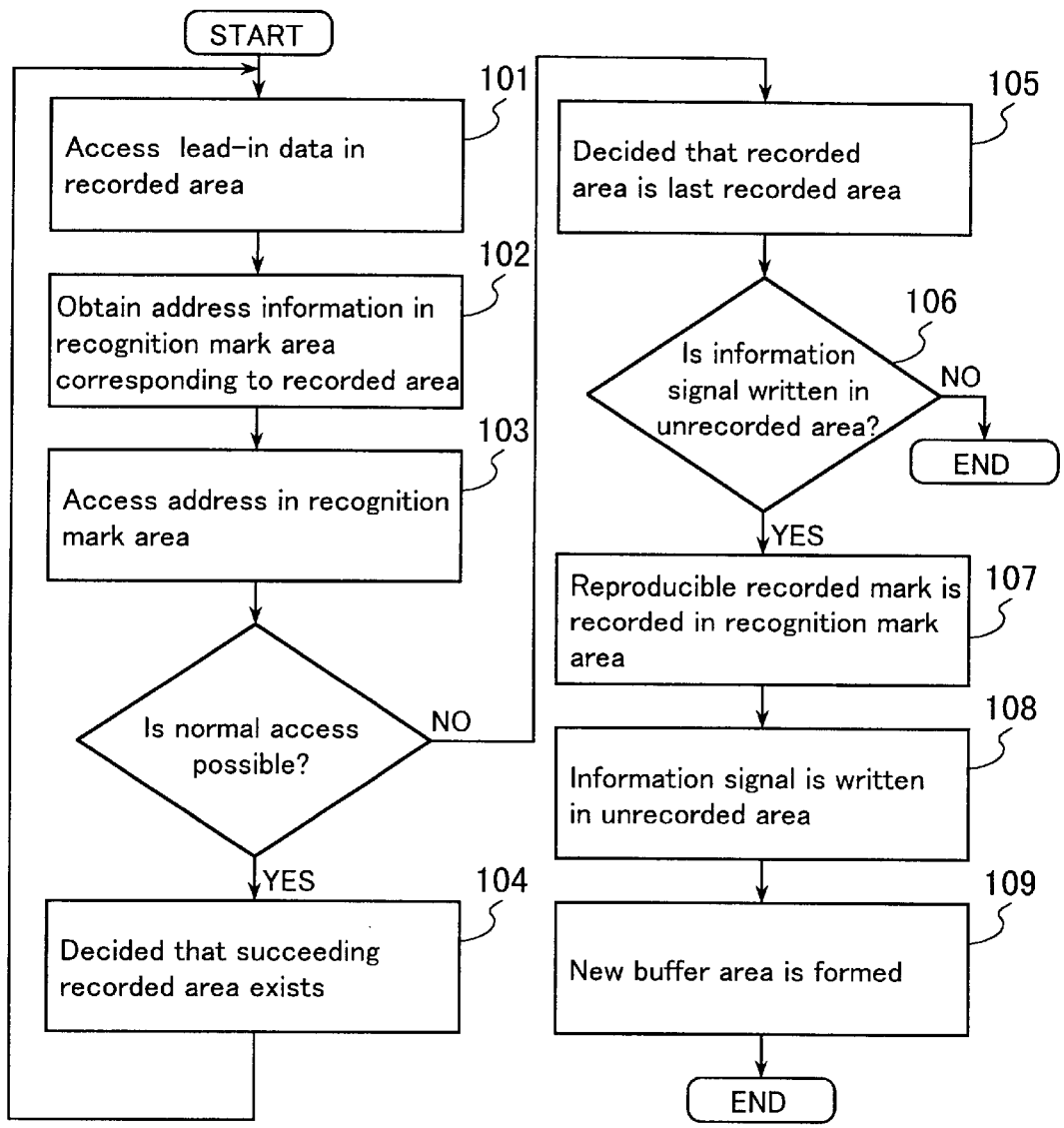
FIG. 3 is a flowchart showing an operation of a recording and reproducing device for an optical disc in one embodiment according to the present invention.
Figure 4:
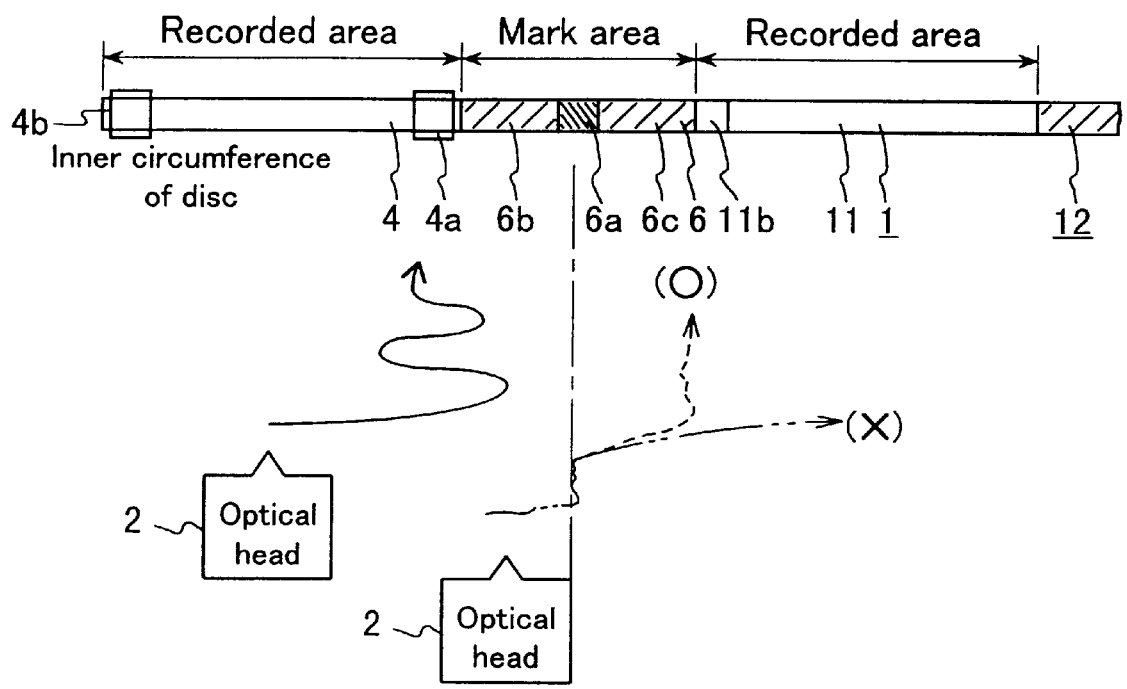
FIG. 4 is a view to explain an accessing state of an optical head in one embodiment according to the present invention.

Next, an operation of the recording and reproducing device for the optical disc having the above-mentioned structure is described with reference to FIG. 1 and FIGS. 3 to 5. FIG. 3 is a flowchart showing an operation of a recording and reproducing device for an optical disc in one embodiment according to the present invention, FIG. 4 is a view to explain an accessing state of an optical head in one embodiment according to the present invention, and FIG. 5 is a view to explain a method for recording information on an optical disc in one embodiment according to the present invention.

First, an access command to the lead-in data in the lead-in area 4*b* of the recorded area 4 is transmitted from the access control means 8 to the servo control means 3. The optical head 2 is moved in the direction of the diameter of the optical disc 1 based on the information from the servo control means 3, and then the optical head 2 accesses the lead-in data in the lead-in area 4*b* of the recorded area 4 (Step 101). Thereby, the address information of the recognition area 6*d* corresponding to this recorded area can be obtained (Step 102). Furthermore, since the first buffer area 6*b* having a width wider than an access error when the last data 4*a* in the recorded area 4 is accessed is provided between the last data 4 in the recorded area 4 and the recognition mark area 6*d*, even if there is the access error when the last data 4*a* in the recorded area 4 is accessed, the optical head 2 does not jump to the recognition mark area 6*d* (shown by a solid line arrow in FIG. 4). Accordingly, the last data 4*a* in the recorded area 4 can be accessed stably.

Thereafter, an access command to the address of the recognition mark area 6*d* is transmitted from the access control means 8 to the servo control means 3. The optical head 2 is moved in the direction of the diameter of the optical disc 1 based on the information from the servo control means 3, and the optical head 2 accesses the address of the recognition mark area 6*d* (Step 103). When the access to the address of the recognition mark area 6*d* can be performed normally without bringing about a servo off or a data error, it is decided that "a succeeding recorded area exists" (Step 104). In this case, the optical head returns to the Step 101, and accesses the lead-in data in the lead-in area of the succeeding recorded area and repeats the Steps 101 to 103. When the access to the address of the recognition mark area 6*d* cannot be performed normally due to the occurrence of the data error, it is decided that "this recorded area is the last recorded area" (Step 105). More specifically, it is decided that "the outer circumference of this recorded area 4 is the unrecorded area 5" (the state shown in FIG. 5(*a*)). In this case, the second buffer area 6*c* having a width wider than an access error or the amount of slip by the servo when the recognition mark area 6*d* is accessed is provided between the recognition mark area 6*d* and the unrecorded area 5. Therefore, when the recognition mark area 6*d* is accessed, the optical head 2 does not jump to the unrecorded area 5. Furthermore, even if the servo is skipped in the recognition mark area 6*d*, the optical head 2 is relead in until it reaches the unrecorded area 5 (shown by the broken line arrow in FIG. 4), so that the optical head 2 can be prevented from jumping to the unrecorded area 5. As a result, the state in which the servo control cannot be performed, bringing about an abnormal state, can be prevented. The above-mentioned process is the same as that of a reproducing dedicated device.

When it is decided that "this recorded area is the last recorded area" as in the Step 105, it is further decided whether a new information signal is written into the unrecorded area 5 or not (Step 106). When it is decided that a new information signal is written, the erase command of the recognition mark is transmitted from the access control means 8 to the mark control means 9. Then, the mark control means 9 performs the erase control of the recognition mark with respect to the recording signal control means 7 based on the information from the access control means 8 and the address detecting means 10, and, as shown in FIGS. 5(*a*) and 5(*b*), the reproducible recording mark 6*a* is recorded on the recognition mark area 6*d*, so that the recognition mark is erased (Step 107). Thereafter, the information signal to be written in the unrecorded area 5 is transmitted from the recording signal control means 7 to the optical head 2, and as shown in FIGS. 5(*b*) and 5(*c*), the information signal is written in the unrecorded area 5 (new recorded area 11 including a new lead-in area 11*b* is provided) (Step 108). Then, the recording command of the mark area is transmitted from the access control means 8 to the mark control means 9. Then, the mark control means 9 performs the recording control of the mark area with respect to the recording signal control means 7 based on the information from the access control means 8 and the address detecting means 10. As shown in FIG. 5(*c*), behind the new recorded area 11, new first and second buffer areas 12*b* and 12*c* are recorded, and at the same time a new recognition mark area 12*d* in which no recording mark exists is formed (Step 109). Behind the second buffer area 12*c*, a new unrecorded area 13 is provided. Furthermore, it is decided that a new information signal is not written in the unrecorded area 5, the operation terminates in this state.

Furthermore, after a plurality of the recorded areas 4 and 11 are completed as mentioned above, the information is reproduced as follows. More specifically, first, the optical head 2 is moved in the direction of the diameter of the optical disc 1 based on the information from the servo control means 3, and the recognition mark area is retrieved. Then, the optical head 2 irradiates the recognition mark area with a light beam spot having a predetermined strength, whereby the state of the recognition mark area is determined. Thereafter, based on the determined state of the recognition mark area, the recorded area in which the recording is completed is specified. Then, the optical head 2 irradiates The specified recorded area with a light beam spot having a predetermined strength, whereby the information of this recorded area is reproduced.

In the above-mentioned embodiment, when the succeeding recorded area does not exist, the state of the recognition mark area 6*d* is the state in which the recording mark 6*a* does not exist (the state in which the recognition mark exists); and, when the succeeding recorded area exists, the recognition mark is erased by recording the reproducible recording mark 6*a* on the recognition mark area 6*d*. However, the method is not limited to this alone. For example, the following method may be employed, i.e., when the succeeding recorded area does not exist, a reproducible recording mark 6*a* is recorded on the recognition mark area 6*d* so as to make the state in which the recognition mark does not exist, and when the succeeding recorded area exists, arbitrary data is double-written on the recognition mark area 6*d*, thereby rewriting the reproducible recording mark 6*a* into the non-reproducible recording mark. Herein, the state in which no recognition mark exists can be realized by recording the same data as the first buffer area 6*b* behind the first buffer area 6*b*, and followed by recording the second buffer area 6*c*. Furthermore, the double writing is performed by rewriting arbitrary data (in general, data which zero is encoded). In this case, the reproducing device determines that access to the recognition mark area 6*d* can be performed normally, or data of the recognition mark area 6*d* can be reproduced, thereby deciding that the recorded area 4 is the last recorded area.

Figure 6:
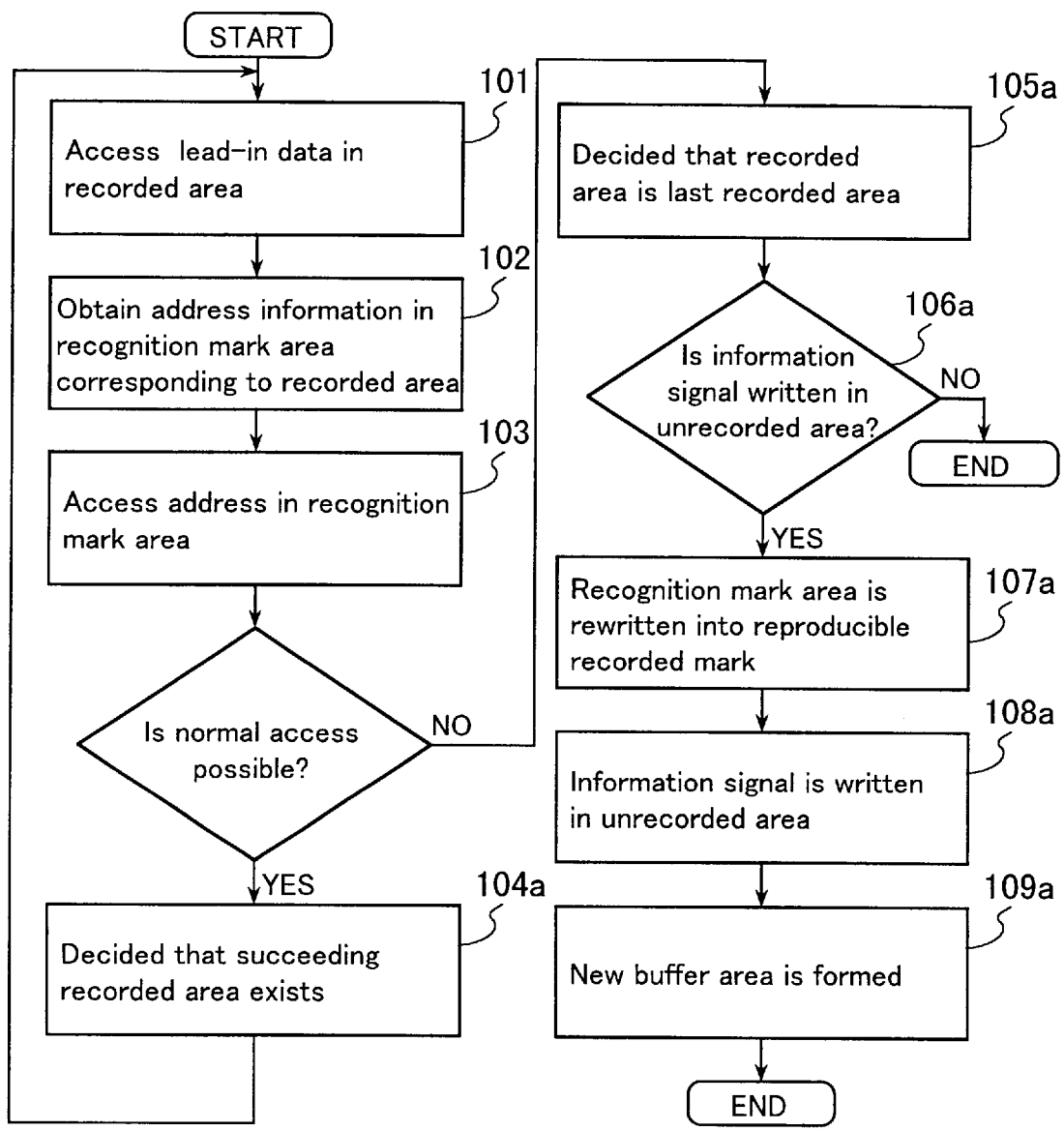
FIG. 6 is a flowchart showing an operation of a recording and reproducing device for another optical disc in one embodiment according to the present invention.
Figure 7:
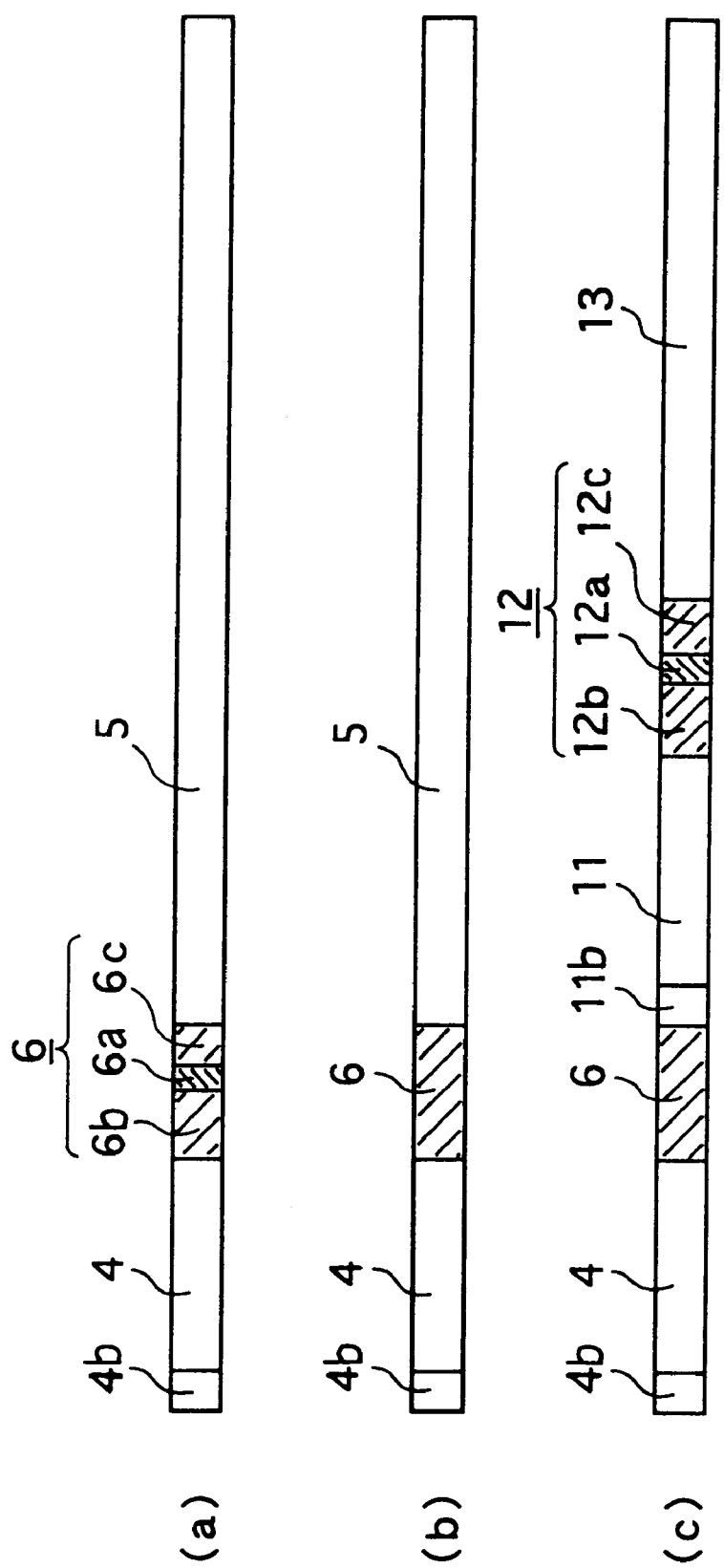
FIG. 7 is a view to explain a method for recording information on another optical disc in one embodiment according to the present invention.

Hereinafter, the operation of the recording and reproducing device for the optical disc in this case will be described with reference to FIGS. 6 and 7. Moreover, descriptions of Steps 101 to 103 will be omitted because they are the same as the above-mentioned embodiment (see FIG. 3).

When the access to the address of the recognition mark area 6*d* causes a data error, bringing about an abnormal access, it is decided that "a succeeding recorded area exists" (Step 104*a*). In this case, returning to the Step 101 and the optical head accesses the lead-in data in the lead-in area of the succeeding recorded area, and the steps 101 to 103 are repeated. When the access to the address of the recognition mark area 6*d* results in the normal access without bringing about a servo off or a data error, it is decided that "this recorded area is the last recorded area" (Step 105*a*). Namely, it is decided that "the side of the outer circumference of the recorded area 4 is unrecorded area 5" (a state shown in FIG. 7(*a*)).

When it is decided that "this recorded area is the last recorded area" as in Step 105*a*, it is further decided whether a new information signal is written in the unrecorded area 5 or not (Step 106*a*). When it is decided that a new information signal is written, a marking command of the recognition mark is transmitted from the access control means 8 to the mark control means 9, the mark control means 9 performs the marking control of the recognition mark with respect to the recording signal control means 7 based on the information from the access control means 8 and the address detecting means 10, and, as shown in FIGS. 7(*a*) and 7(*b*), the reproducible recording mark 6*a* is rewritten into the non-reproducible recording mark by double-writing arbitrary data on the recognition mark area 6*d*, whereby the recognition mark is recorded (Step 107*a*). Thereafter, information signals to be written on the unrecorded area 5 are transmitted from the recording signal control means 7 to the optical head 2, and, as shown in FIGS. 7(*b*) and 7(*c*), information signals are written on the unrecorded area 5 (a new recorded area 11 including a new lead-in area 11*b* is provided) (Step 108*a*). Then, the recording command of the marking area is transmitted from the access control means 8 to the mark control means 9; the mark control means 9 performs the recording control of the marking area with respect to the recording signal control means 7 based on the information from the access control means 8 and address detecting means 10; and, as shown in FIG. 7(c), new first and second buffer areas 12b and 12c are recorded behind the new recorded area 11 and a reproducible recording mark is recorded on the recognition mark area (Step 109a); and a new unrecorded area 13 is provided behind the second buffer area 12c. In this case, since the reproducing device decides the last recorded area by recognizing that an access to the recognition mark area can normally be performed, or data of the recognition mark area can be reproduced, it is decided that the recorded area 11 instead of the recorded area 4 is the last recorded area. Furthermore, when it is decided that a new information signal is not written in the unrecorded area 5, the operation terminates in this state.

Furthermore, after the recording of a plurality of recorded areas 4 and 11 are completed as mentioned above, information is reproduced as follows. More specifically, first, the optical head 2 is moved in the direction of the diameter of the optical disc 1 based on the information from the servo control means 3, and the recognition mark area is retrieved. Then, the optical head 2 irradiates the recognition mark area with a light beam spot having a predetermined strength, and the state of the recognition mark area is determined. Then, the recorded area in which the recording is completed is specified based on the determined state of the recognition mark area. Then, the optical head 2 irradiates the specified recorded area with a light beam spot having a predetermined strength, whereby the information in the recorded area is reproduced.

Furthermore, in the above-mentioned embodiment, after the recognition mark is recorded on the information track of the recognition mark area 6d, or after the recorded recognition mark is erased, an information signal is written in the unrecorded area 5. However, the order of the process is not limited to this alone. The process may be employed in which information signals are written in the unrecorded area 5 and then the recognition mark is recorded on the information track of the recognition mark area 6d, or the recorded recognition mark is erased.

Furthermore, in the above-mentioned embodiment, the optical disc 1 in which a single recorded area 4 is first provided was described, however, the optical disc is not limited to this structure alone, and an optical disc in which a plurality of recorded areas are first provided may be employed so as to obtain the same effect.

Furthermore, in the above-mentioned embodiment, as the method for forming non-reproducible recording mark, the method in which arbitrary data are double-written all over the recognition mark area was described. However, the method is not limited to this alone. For example, a non-reproducible recording mark may be formed by a method for intermittently double writing, or a method for intermittently erasing the recording mark, and the like.

Furthermore, in the erasable recording and reproducing disc, as the state of the recognition mark area corresponding to the last recorded area and the state corresponding to the recorded area other than the above, two states arbitrarily selected from three states: a state in which no recording mark is formed, a state in which a reproducible recording mark is formed and a state in which a non-reproducible mark is formed can be employed.

Industrial Applicability

As mentioned above, the present invention can be used for recording and reproducing of an optical disc which has a recognition mark area behind a recorded area and in which the last data in the recorded area is accessed stably, the recognition mark area can be accessed without bringing about an abnormal state, and the first data in a succeeding recorded area, if it exists, is accessed stably.

What is claimed is:

1. An optical disc having a concentric or spiral information track, wherein, behind a recorded area in which information is recorded on said information track, a first buffer area having a width wider than an access error when the last data in said recorded area is accessed and a recognition mark area are formed.

2. The optical disc according to claim 1, wherein the width of said first buffer area is 20 tracks or more and 100 tracks or less.

3. The optical disc according to claim 1, wherein the width of said recognition mark area is 2 tracks or less.

4. The optical disc according to claim 1, wherein said recognition mark area is in any of states selected from the group consisting of a state in which no recording mark exists, a state in which a reproducible recording mark is formed and a state in which a non-reproducible recording mark is formed.

5. The optical disc according to claim 1, wherein, behind said recognition mark area, a second buffer area having a width wider than an access error when said recognition mark area is accessed is further formed.

6. The optical disc according to claim 5, wherein the width of said second buffer area is 20 tracks or more and 100 tracks or less.

7. An optical disc having a concentric or spiral information track, wherein a first buffer area having a width of 20 tracks or more and 100 tracks or less, a recognition mark area having the width of 2 tracks or less, and a second buffer area having a width of 20 track or more and 100 tracks or less are formed behind each of N (wherein N is a natural number) recorded areas in which information is recorded on said information track.

8. An optical disc having a concentric or spiral information track, wherein a plurality of its including a recorded area in which information is recorded on said information track, a first buffer area being provided behind said recorded area and having a width of 20 tracks or more and 100 tracks or less, a recognition mark area having a width of 2 tracks or less and a second buffer area having a width of 20 tracks or more and 100 tracks or less are continuously formed, wherein the formed state of said last recognition mark area among a plurality of recognition mark areas is different from the formed states of the other recognition mark areas.

9. The optical disc according to claim 8, wherein said recognition mark area is in any of states selected from the group consisting of a state in which no recording mark exists, a state in which a reproducible recording mark is formed and a state in which a non-reproducible recording mark is formed.

10. A recording method for an optical disc, information being recorded by irradiating an information track of an optical disc with light beam generated from a light source and by modulating the strength of said light beam in accordance with recording signals, wherein, following the recording of a predetermined information, a first buffer area having a width wider than an access error when the last data in said predetermined information is accessed and a recognition mark area are formed.

11. The recording method for an optical disc according to claim 10, wherein the width of said first buffer area is set to be 20 tracks or more and 100 tracks or less.

12. The recording method for an optical disc according to claim 10, wherein the width of said recognition mark area is set to be 2 tracks or less.

13. The recording method for an optical disc according to claim 10, wherein said recognition mark area is in any of states selected from the group consisting of a state in which no recording mark exists, a state in which a reproducible recording mark is formed and a state in which a non-reproducible recording mark is formed.

14. The recording method for an optical disc according to claim 10, wherein, behind the recognition mark area, a second buffer area having a width wider than an access error when said recognition mark area is accessed is further formed.

15. The recording method for an optical disc according to claim 14, wherein the width of said second buffer area is set to be 20 tracks or more and 100 tracks or less.

16. A recording method for an optical disc, information being additionally recorded on said optical disc in which, behind a recorded area in which information is recorded on a concentric or spiral information track, a first buffer area having a width wider than an access error when the last data in said recorded area is accessed, a recognition mark area and a second buffer area having a width wider than an access error when said recognition mark area is accessed are formed, said method comprising:

the steps of irradiating said information track of said optical disc, which is made to rotate, with a light beam generated from a light source; controlling said light beam to be positioned on said information track in said recognition mark area; changing the state of said recognition mark area by modulating the strength of said light beam; retrieving a recordable area in which information is to be additionally recorded and controlling said light beam to be positioned on said information track in said recordable area; and modulating the strength of said light beam in accordance with signals to be additionally recorded and recording the additional information.

17. The recording method for an optical disc according to claim 16, wherein the state of the recognition mark area is changed and then the additional information is recorded on the information track in the recordable area.

18. The recording method for an optical disc according to claim 16, wherein the additional information is recorded on said information track in the recordable area and then the state of said recognition mark area is changed.

19. The recording method for an optical disc according to claim 16, wherein, behind said recorded area in which the additional information is recorded, said first buffer area having the width wider than an access error when the last data of the additional information in the recorded area is accessed and said recognition mark area are formed.

20. The recording method for an optical disc according to claim 19, wherein the width of said first buffer area is set to be 20 tracks or more and 100 tracks or less.

21. The recording method for an optical disc according to claim 19, wherein the width of said recognition mark area is set to be 2 tracks or less.

22. The recording method for an optical disc according to claim 19, wherein, behind said recognition mark area, said second buffer area having the width wider than an access error when said recognition mark area is accessed is formed.

23. The recording method for an optical disc according to claim 22, wherein the width of said second buffer area is set to be 20 tracks or more and 100 tracks or less.

24. A recording device for an optical disc, comprising a rotating means for rotating said optical disc having a concentric or spiral information track, an optical head irradiating said information track with light beam generated from a light source, a control means for controlling said light beam to be positioned on said information track, a modulating means for modulating the strength of said light beam in accordance with information signals to be recorded, wherein said light beam is modulated by said modulating means and, behind a recorded area in which a predetermined information is recorded on said information track, a first buffer area having a width wider than an access error when the last data of said predetermined information is accessed and a recognition mark area are formed.

25. The recording device for an optical disc according to claim 24, wherein the width of said first buffer area is set to be 20 tracks or more and 100 tracks or less.

26. The recording device for an optical disc according to claim 24, wherein the width of said recognition mark area is set to be 2 tracks or less.

27. The recording device for an optical disc according to claim 24, wherein said recognition mark area is in any of states selected from the group consisting of a state in which no recording mark exists, a state in which a reproducible recording mark is formed and a state in which a non-reproducible recording mark is formed.

28. The recording device for an optical disc according to claim 24, wherein, behind said recognition mark area, a second buffer area having a width wider than an access error when said recognition mark area is accessed is further formed.

29. The recording device for an optical disc according to claim 28, wherein the width of said second buffer area is set to be 20 tracks or more and 100 tracks or less.

30. A recording device for an optical disc, information being additionally recorded on said optical disc in which, behind a recorded area in which information is recorded on a concentric or spiral information track, a first buffer area having a width wider than an access error when the last data in said recorded area is accessed, a recognition mark area and a second buffer area having a width wider than an access error when said recognition mark area is accessed are formed, comprising:

a rotating means for rotating said optical disc, an optical head for irradiating said information track with light beam generated from a light source, a retrieving means for retrieving a target information track and controlling said light beam to be positioned on said target information track, and a modulating means for modulating the strength of said light beam:

wherein, when new information is additionally recorded on said optical disc, said information track of the recordable area in which additional information is to recorded is retrieved by said retrieving means, and then information is additionally recorded on said information track of said recordable area by modulating the strength of light beam in accordance with signals to be additionally recorded by said modulating means, while said recognition mark area is retrieved by said retrieving means, and then the state of said recognition mark area is changed by modulating the strength of light beam by said modulating means.

31. The recording device for an optical disc according to claim 30, wherein the state of said recognition mark area is changed and then the additional information is recorded on said information track in said recordable area.

32. The recording device for an optical disc according to claim 30, wherein the additional information is recorded on said information track of said recordable area and then the state of said recognition mark area is changed.

33. The recording device for an optical disc according to claim 30, wherein, behind said recorded area in which the additional information is recorded, a further first buffer area having a width wider than an access error when the last data of the additional information in the recorded area is accessed and a further recognition mark area are formed.

34. The recording device for an optical disc according to claim 33, wherein the width of said further first buffer area is set to be 20 tracks or more and 100 tacks or less.

35. The recording device for an optical disc according to claim 33, wherein the width of said further recognition mark area is set to be 2 tracks or less.

36. The recording device for an optical disc according to claim 33, wherein, behind said further recognition mark area, a further second buffer area having a width wider than an access error when said further recognition mark area is accessed is further formed.

37. The recording device for an optical disc according to claim 36, wherein the width of said further second buffer area is set to be 20 tracks or more and 100 tracks or less.

38. A reproducing method for an optical disc, information being reproduced from said optical disc in which, behind a recorded area in which information is recorded on a concentric or spiral information track, a first buffer area having a width wider than an access error when the last data in said recorded area is accessed, and a recognition mark area are formed:
said method comprising the steps of irradiating said information track of said optical disc, which is made to be rotating, with light beam generated from a light source; retrieving said recognition mark area; determining the state of said recognition mark area; and specifying said recorded area in which recording is completed based on the determined state of said recognition mark area and reproducing information of said specified recorded area.

39. The reproducing method for an optical disc according to claim 38, wherein the width of said first buffer area is set to be 20 tracks or more and 100 tracks or less.

40. The reproducing method for an optical disc according to claim 38, wherein the width of said recognition mark area is 2 tracks or less.

41. The reproducing method for an optical disc according to claim 38, wherein said recognition mark area is in any of states selected from the group consisting of a state in which no recording mark exists, a state in which a reproducible recording mark is formed and a state in which a non-reproducible recording mark is formed.

42. The reproducing method for an optical disc according to claim 38, wherein, behind said recognition mark area, a second buffer area having a width wider than an access error when said recognition mark area is accessed is further formed on said optical disc.

43. The reproducing method for an optical disc according to claim 42, wherein the width of said second buffer area is set to be 20 tracks or more and 100 tracks or less.

44. A reproducing device for an optical disc, information being reproduced from said optical disc in which, behind a recorded area in which information is recorded on a concentric or spiral information track, a first buffer area having a width wider than an access error when the last data in said recorded area is accessed, and a recognition mark area are formed, comprising:
a rotating means for rotating said optical disc, an optical head for irradiating said information track with light beam generated from a light source; and a retrieving means for retrieving a target information track; wherein the state of said recognition mark area is determined by retrieving said recognition mark area by said retrieving means, and said recorded area in which recording is completed is identified based on the determined state of said recognition mark area.

45. The reproducing device for an optical disc according to claim 44, wherein the width of said first buffer area is set to be 20 tracks or more and 100 tracks or less.

46. The reproducing device for an optical disc according to claim 44, wherein the width of said recognition mark area is set to be 2 tracks or less.

47. The reproducing device for an optical disc according to claim 44, wherein said recognition mark is in any of states selected from the group consisting of a state in which no recording mark exists, a state in which a reproducible recording mark is formed and a state in which a non-reproducible recording mark is formed.

48. The reproducing device for an optical disc according to claim 44, wherein, behind said recognition mark area, a second buffer area having a width wider than an access error when said recognition mark area is accessed is further formed on said optical disc.

49. The reproducing device for an optical disc according to claim 48, wherein the width of said second buffer area is set to be 20 tracks or more and 100 tracks or less.

50. A reproducing device for an optical disc, information being reproduced from said optical disc in which, behind a recorded area in which information is recorded on a concentric or spiral information track, a first buffer area having a width wider than an access error when the last data in said recorded area is accessed, a recognition mark area in which no recording mark exists and a second buffer area having a width wider than an access error when said recognition mark area is accessed are formed, comprising;
a rotating means for rotating said optical disc, an optical head for irradiating said information track with light beam generated from a light source, a retrieving means for retrieving a target information track, and a reading means for reading the information recorded on said information track; wherein said recorded area to be reproduced is identified by determining that no recording mark exists in said recognition mark area.

51. A reproducing device for an optical disc, information being reproduced from said optical disc in which, behind a recorded area in which information is recorded on a concentric or spiral information track, a first buffer area having a width wider than an access error when the last data in said recorded area is accessed, a recognition mark area in which no recording mark exists and a second buffer area having a width wider than an access error when said recognition mark area is accessed are formed, comprising:
a rotating means for rotating said optical disc, an optical head for irradiating said information track with light beam generated from a light source, and a retrieving means for retrieving a target information track; wherein said recorded area to be reproduced is identified by retrieving said recognition mark area by said retrieving means and by determining that said recording mark cannot be retrieved.

52. The reproducing device for an optical disc according to claim 51, further comprising a reading means for reading information recorded on said information track,
wherein said recorded area to be reproduced is specified by determining that said recording mark cannot be read by said reading means.

53. A reproducing device for an optical disc, information being reproduced from said optical disc in which plural sets of a recorded area in which information is recorded, a first buffer area having a width wider than an access error when the last data in said recorded area is accessed, a recognition mark area and a second buffer area having a width wider than an access error when said recognition mark area is accessed are formed on a concentric or spiral information track, wherein no recording mark is recorded in the last recognition mark area and a reproducible recording mark is recorded in the recognition mark areas other than the last recognition mark area, comprising:

a rotating means for rotating said optical disc, an optical head for irradiating said information track with light beam generated from a light source, a retrieving means retrieving a target information track, and a reading means for reading information recorded on said information track; wherein the last recorded area is identified by determining that no recording mark exists in said recognition mark area.

54. A reproducing device for an optical disc, information being reproduced from said optical disc in which plural sets of a recorded area in which information is recorded, a first buffer area having a width wider than an access error when the last data in said recorded area is accessed, a recognition mark area and a second buffer area having a width wider than an access error when said recognition mark area is accessed are formed on a concentric or spiral information track, wherein no recording mark is recorded in the last recognition mark area and a reproducible recording mark is recorded in the recognition mark areas other than the last recognition mark area, comprising:

a rotating means for rotating said optical disc, an optical head for irradiating said information track with light beam generated from a light source, and a retrieving means for retrieving a information track; wherein the last recorded area is specified by retrieving said recognition mark area by said retrieving means and by determining that said recognition mark area cannot be retrieved.

55. A reproducing device for an optical disc, information being reproduced from said optical disc in which plural sets of a recorded area in which information is recorded, a first buffer area having a width wider than an access error when the last data in said recorded area is accessed, a recognition mark area and a second buffer area having a width wider than an access error when said recognition mark area is accessed are formed on a concentric or spiral information track, wherein no recording mark is recorded in the last recognition mark area and a reproducible recording mark is recorded in the recognition mark areas other than the last recognition mark area, comprising:

a rotating means for rotating said optical disc, an optical head for irradiating said information track with a light beam generated from a light source, a retrieving means retrieving a target information track, and a reading means for reading information recorded on said information track; wherein the last recorded area is identified by retrieving said recognition mark area by said retrieving means and by determining that said recognition mark area cannot be read by said reading means.

56. A reproducing device for an optical disc, information being reproduced from said optical disc in which, behind a recorded area in which information is recorded on a concentric or spiral information track, a first buffer area having a width wider than an access error when the last data in said recorded area is accessed, a recognition mark area in which a reproducible recording mark is recorded, and a second buffer area having a width wider than an access error when said recognition mark area is accessed are formed, comprising:

a rotating means for rotating said optical disc, an optical head for irradiating said information track with light beam generated from a light source, a retrieving means for retrieving a target information track, and a reading means for reading the information recorded on said information track; wherein said recorded area to be reproduced is identified by determining that the reproducible recording mark is recorded in said recognition mark area.

57. A reproducing device for an optical disc, information being reproduced from said optical disc in which, behind a recorded area in which information is recorded on a concentric or spiral information track, a first buffer area having a width wider than an access error when the last data in said recorded area is accessed, a recognition mark area in which a reproducible recording mark is recorded, and a second buffer area having a width wider than an access error when said recognition mark area is accessed are formed, comprising:

a rotating means for rotating said optical disc, an optical head for irradiating said information track with light beam generated from a light source, a retrieving means for retrieving a target information track; wherein said recorded area to be reproduced is identified by retrieving said recognition mark area by said retrieving means and by determining that said recording mark can be retrieved.

58. The reproducing device for an optical disc according to claim 57, further comprising a reading means for reading information recorded on said information track, wherein said recorded area to be reproduced is identified by determining that said recording mark area can be read by said reading means.

59. A reproducing device for an optical disc, information being reproduced from said optical disc in which plural sets of a recorded area in which information is recorded, a first buffer area having a width wider than an access error when the last data in said recorded area is accessed, a recognition mark area and a second buffer area having a width wider than an access error when said recognition mark area is accessed are formed on a concentric or spiral information track, wherein a reproducible recording mark is recorded on the last recognition mark area and a non-reproducible recording mark is recorded on the recognition mark area other than the last recognition mark area, comprising:

a rotating means for rotating said optical disc, an optical head for irradiating said information track with light beam generated from a light source, a retrieving means for retrieving a target information track, and a reading means for reading information recorded on said information track, wherein the last recorded area is identified by determining that said reproducible recording mark exists in said recognition mark area.

60. A reproducing device for an optical disc, information being reproduced from said optical disc in which plural sets of a recorded area in which information is recorded, a first buffer area having a width wider than an access error when the last data in said recorded area is accessed, a recognition mark area and a second buffer area having a width wider than an access error when said recognition mark area is accessed are formed on a concentric or spiral information track, wherein a reproducible recording mark is recorded on the last recognition mark area and a non-reproducible recording mark is recorded on the recognition mark area other than the last recognition mark area, comprising:

a rotating means for rotating said optical disc, an optical head for irradiating said information track with light beam generated from a light source, and a retrieving means for retrieving a target information track; wherein the last recorded area is identified by retrieving said recognition mark area by said retrieving means and by determining that said recognition mark area can be retrieved.

61. The reproducing device for an optical disc according to claim 60, further comprising a reading means for reading information recorded on said information track, wherein said last recorded area is specified by determining that said recording mark area can be read by said reading means.

* * * * *

UNITED STATES PATENT AND TRADEMARK OFFICE
CERTIFICATE OF CORRECTION

PATENT NO. : 6,751,176 B1 Page 1 of 1
DATED : September 30, 2005
INVENTOR(S) : Kanda et al.

It is certified that error appears in the above-identified patent and that said Letters Patent is hereby corrected as shown below:

Title page,
Item [22], PCT Filed, "Jan. 28, 1999" should read -- July 8, 1998 --.

Column 13,
Line 49, "substrate recording layer protecting" should read -- substrate · recording layer · protecting --.

Column 15,
Line 62, "irradiates The specified recording" should read -- irradiates the specified recording --.

Column 18,
Line 37, "of its" should read -- of units --.

Column 19,
Line 19, "having,a width" should read -- having a width --.

Column 20,
Line 49, "is to recorded" should read -- is to be recorded --.

Column 23,
Line 25, "a information" should read -- a target information --.

Signed and Sealed this

Tenth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,751,176 B1 Page 1 of 1
DATED : June 15, 2004
INVENTOR(S) : Kanda et al.

It is certified that error appears in the above-identified patent and that said Letters Patent is hereby corrected as shown below:

Title page,
Item [22], PCT Filed, "Jan. 28, 1999" should read -- July 8, 1998 --.

Column 13,
Line 49, "substrate recording layer protecting" should read -- substrate · recording layer · protecting --.

Column 15,
Line 62, "irradiates The specified recording" should read -- irradiates the specified recording --.

Column 18,
Line 37, "of its" should read -- of units --.

Column 19,
Line 19, "having,a width" should read -- having a width --.

Column 20,
Line 49, "is to recorded" should read -- is to be recorded --.

Column 23,
Line 25, "a information" should read -- a target information --.

This certificate supersedes Certificate of Correction issued January 10, 2006.

Signed and Sealed this

Twenty-first Day of March, 2006

JON W. DUDAS
*Director of the United States Patent and Trademark Office*